(12) United States Patent
Hirata et al.

(10) Patent No.: US 10,989,972 B2
(45) Date of Patent: Apr. 27, 2021

(54) LIQUID CRYSTAL DISPLAY DEVICE

(71) Applicant: Panasonic Liquid Crystal Display Co., Ltd., Hyogo (JP)

(72) Inventors: Masafumi Hirata, Hyogo (JP); Masashi Kuno, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 21 days.

(21) Appl. No.: 16/363,464

(22) Filed: Mar. 25, 2019

(65) Prior Publication Data

US 2019/0302558 A1 Oct. 3, 2019

(30) Foreign Application Priority Data

Mar. 29, 2018 (JP) ................................ JP2018-066215

(51) Int. Cl.
  *G02F 1/1362* (2006.01)
  *G02F 1/13* (2006.01)
  *G02F 1/1368* (2006.01)

(52) U.S. Cl.
  CPC ...... *G02F 1/136286* (2013.01); *G02F 1/1309* (2013.01); *G02F 1/1368* (2013.01); *G02F 2001/136254* (2013.01)

(58) Field of Classification Search
  CPC . G02F 1/136286; G02F 1/1309; G02F 1/1368
  See application file for complete search history.

(56) References Cited

U.S. PATENT DOCUMENTS

| | | | | |
|---|---|---|---|---|
| 5,841,410 A | * | 11/1998 | Oda | G09G 3/3648 345/58 |
| 9,542,039 B2 | * | 1/2017 | Bi | G06F 3/0418 |
| 2004/0169627 A1 | * | 9/2004 | Hong | G09G 5/02 345/89 |
| 2004/0263460 A1 | * | 12/2004 | Lu | G09G 3/3648 345/98 |
| 2008/0180416 A1 | * | 7/2008 | Yoshida | G09G 3/20 345/204 |

(Continued)

FOREIGN PATENT DOCUMENTS

| | | | |
|---|---|---|---|
| CN | 206210350 U | * | 5/2017 |
| JP | 2010091286 A | * | 2/2001 |

(Continued)

*Primary Examiner* — Nitin Patel
*Assistant Examiner* — Robert M Stone
(74) *Attorney, Agent, or Firm* — Hamre, Schumann, Mueller & Larson, P.C.

(57) ABSTRACT

A liquid crystal display device includes: common electrodes that are opposed to pixel electrodes respectively; a detection circuit that detects a waveform of a common potential at the plurality of common electrodes; and a determination circuit that determines abnormality of the liquid crystal display device based on the waveform detected by the detection circuit. A plurality of pixels are divided into a plurality of segments, the common electrodes are provided corresponding to the plurality of segments, and the detection circuit detects the waveform of the common potential at each of the common electrodes when a predetermined data signal is input to at least one of data signal lines whiled a predetermined gate signal is input to at least one of gate signal lines.

12 Claims, 9 Drawing Sheets

(56) References Cited

U.S. PATENT DOCUMENTS

| | | | | |
|---|---|---|---|---|
| 2008/0238833 | A1* | 10/2008 | Hioki | G09G 3/3233 345/76 |
| 2011/0205480 | A1* | 8/2011 | Hayata | G09G 3/006 349/149 |
| 2014/0232691 | A1* | 8/2014 | Lee | G06F 3/03545 345/174 |
| 2014/0292833 | A1* | 10/2014 | Matsushima | G09G 3/3648 345/690 |
| 2015/0029081 | A1 | 1/2015 | Kawachi et al. | |
| 2015/0179132 | A1* | 6/2015 | Lee | G06F 3/0416 345/174 |
| 2015/0179133 | A1* | 6/2015 | Lee | G09G 3/20 345/174 |
| 2015/0220208 | A1* | 8/2015 | Noguchi | G06F 3/044 345/174 |
| 2016/0275837 | A1* | 9/2016 | Toyoshima | G09G 3/3655 |
| 2016/0328062 | A1* | 11/2016 | Jin | G02F 1/1345 |
| 2016/0328075 | A1* | 11/2016 | Luo | G06F 3/044 |
| 2016/0358525 | A1* | 12/2016 | Huang | G09G 3/006 |
| 2017/0003775 | A1* | 1/2017 | Hu | G06F 3/0412 |
| 2017/0090643 | A1* | 3/2017 | Kim | G06F 3/0412 |
| 2017/0090673 | A1* | 3/2017 | Kim | G06F 3/0418 |
| 2017/0186391 | A1* | 6/2017 | Ochiai | G09G 3/3696 |
| 2017/0205956 | A1* | 7/2017 | Li | G06F 3/0412 |
| 2017/0262112 | A1* | 9/2017 | Noguchi | G02F 1/134336 |
| 2018/0336863 | A1* | 11/2018 | Zhang | G09G 3/3655 |
| 2019/0012017 | A1* | 1/2019 | Kurasawa | G06F 3/044 |
| 2019/0073971 | A1* | 3/2019 | Bai | G09G 3/3688 |
| 2019/0079624 | A1* | 3/2019 | Kim | G09G 3/3677 |
| 2019/0187832 | A1* | 6/2019 | Lee | G06F 3/0412 |
| 2019/0304350 | A1* | 10/2019 | Siu | G09G 3/006 |
| 2020/0027381 | A1* | 1/2020 | Hashimoto | G09G 3/3696 |

FOREIGN PATENT DOCUMENTS

| | | |
|---|---|---|
| JP | 2010-212937 | 9/2010 |
| WO | 2013/179537 | 5/2013 |

* cited by examiner

LIQUID CRYSTAL DISPLAY DEVICE

CROSS REFERENCE TO RELATED APPLICATION

The present application is based on and claims priority of Japanese Patent Application No. 2018-066215 filed on Mar. 29, 2018. The entire disclosure of the above-identified application, including the specification, drawings and claims is incorporated herein by reference in its entirety.

TECHNICAL FIELD

The present disclosure relates to a liquid crystal display device.

BACKGROUND

A liquid crystal display device incorporated in a monitor may deteriorate over time due to use by a user. For example, when a transistor or the like constituting a pixel of the liquid crystal display device deteriorates over time to become an abnormal state, image quality of the liquid crystal display device is degraded. In particular, long-term reliability of video is required for monitors used in a medical field or a broadcasting field.

For example, Unexamined Japanese Patent Publication No. 2010-212937 proposes a technique of calibrating the liquid crystal display device using a dedicated calibration device in order to correct the abnormal state due to the deterioration over time of the liquid crystal display device.

SUMMARY

However, the calibration of the liquid crystal display device using the dedicated calibration device is troublesome.

For the liquid crystal display device, in addition to the abnormality due to the deterioration over time, a data signal line or a gate signal line is disconnected or short-circuited during a manufacturing process or transportation, or failure of the transistor of the pixel occurs, which results in occurrence of the abnormality (defect) of the liquid crystal display device in some cases.

For this reason, there is a demand for a technique capable of easily determining the abnormality in the liquid crystal display device.

The present disclosure provides a liquid crystal display device that can self-determine the abnormality.

A liquid crystal display device according to the present disclosure including a plurality of pixels arranged in a matrix form, includes: a plurality of transistors and a plurality of pixel electrodes, which are provided in each of the plurality of pixels, respectively; a plurality of gate signal lines that extend in a first direction and are connected to gate electrodes of the plurality of transistors, respectively; a plurality of data signal lines that extend in a second direction different from the first direction and are connected to source electrodes or drain electrodes of the plurality of transistors, respectively; a plurality of common electrodes that are opposed to the plurality of pixel electrodes, respectively; a detection circuit that detects a waveform of a common potential at the common electrode; and a determination circuit that determines abnormality of the liquid crystal display device based on the waveform of the common potential detected by the detection circuit. The plurality of pixels are divided into a plurality of segments, the plurality of the common electrodes are provided corresponding to the plurality of segments, and the detection circuit detects the waveform of the common potential at each of the plurality of common electrodes when a predetermined data signal is input to at least one of the plurality of data signal lines whiled a predetermined gate signal is input to at least one of the plurality of gate signal lines.

A liquid crystal display device according to another present disclosure, including a plurality of pixels arranged in a matrix form, includes: a plurality of transistors and a plurality of pixel electrodes, which are provided in each of the plurality of pixels; a plurality of gate signal lines that extend in a first direction and are connected to gate electrodes of the plurality of transistors, respectively; a plurality of data signal lines that extend in a second direction different from the first direction and are connected to source electrodes or drain electrodes of the plurality of transistors, respectively; a common electrode that is opposed to the plurality of pixel electrodes; a detection circuit that detects a waveform of a common potential at the common electrode; and a determination circuit that determines abnormality of the liquid crystal display device based on the waveform of the common potential detected by the detection circuit. While a backlight of the liquid crystal display device is turned off, an inspection gate signal that turns on the transistors of the plurality of pixels is input to at least one of the plurality of gate signal lines, and an inspection data signal is input to at least one of the plurality of data signal lines in a period in which the transistors are turned on, and the determination circuit determines the abnormality of the liquid crystal display device based on the waveform of the common potential in a state in which the backlight is turned off.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

Exemplary Embodiment

Figure 1:
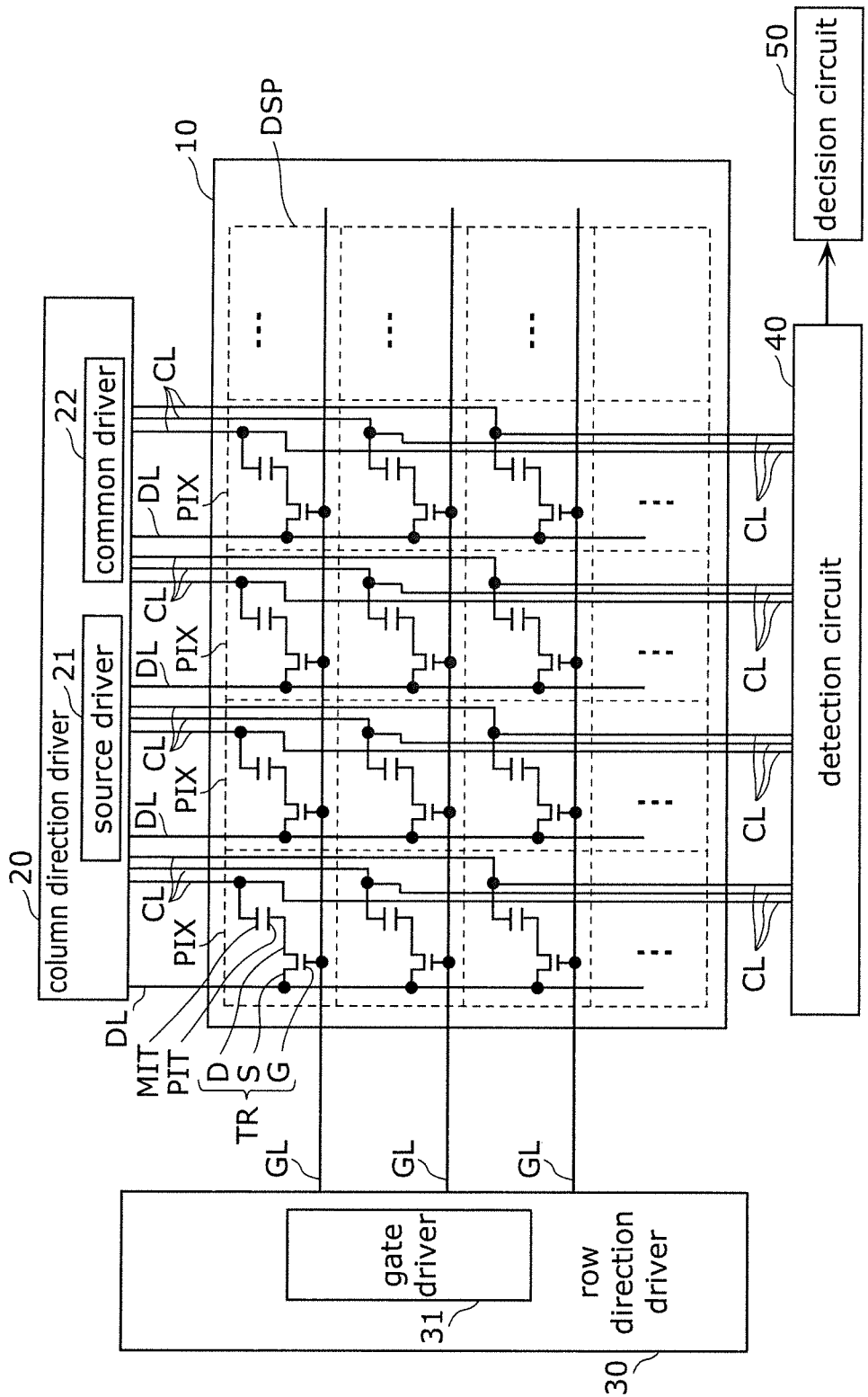
FIG. 1 is a schematic view illustrating a liquid crystal display device according to an exemplary embodiment.

Liquid crystal display device 1 according to an exemplary embodiment will be described below with reference to FIG. 1. FIG. 1 is a view illustrating a schematic configuration of liquid crystal display device 1 of the exemplary embodiment.

As illustrated in FIG. 1, liquid crystal display device 1 includes a plurality of pixels PIX arranged in a matrix form. Liquid crystal display device 1 is an example of a video display device that displays a video in a display region (pixel region) DSP constituted by the plurality of pixels PIX. The video displayed on liquid crystal display device 1 may be either a still image or a moving image.

Liquid crystal display device 1 includes liquid crystal panel 10, column direction driver 20 including source driver 21 and common driver 22, row direction driver 30 including gate driver 31, detection circuit 40, and a determination circuit 50. Although not illustrated, liquid crystal display device 1 includes a backlight disposed on a back surface side of liquid crystal panel 10.

Liquid crystal panel 10 is a display panel that displays a color image. Liquid crystal panel 10 includes a liquid crystal cell in which a liquid crystal layer is provided between a pair of transparent substrates and a pair of polarizing plates sandwiching the liquid crystal cell. One of the pair of transparent substrates is a thin film transistor (TFT) substrate on which TFTs and wirings are formed, and the other of the pair of transparent substrates is a color filter (CF) substrate on which color filters of R (red), G (green) and B (blue) are formed. For example, a driving system of liquid crystal panel 10 is a lateral electric field system such as an in-plane switching (IPS) system or a fringe field switching (FFS) system. Alternatively, the driving system may be a vertical alignment (VA) system or a twisted nematic (TN) system.

As illustrated in FIG. 1, liquid crystal panel 10 includes display region DSP constituted by the plurality of pixels PIX arranged in a matrix form. Transistor TR, pixel electrode PIT, and common electrode MIT are provided in each of the plurality of pixels PIX. Transistor TR is a thin film transistor, and includes gate electrode G, source electrode S, and drain electrode D. It is possible that one of source electrode S and drain electrode D may be named as a first conductive electrode and the other of source electrode S and drain electrode D may be named as a second conductive electrode.

A plurality of gate signal lines (scanning lines) GL extending in a first direction and a plurality of data signal lines (source lines) DL extending in a second direction different from the first direction are formed in liquid crystal panel 10. In the exemplary embodiment, the plurality of gate signal lines GL extend in a row direction as illustrated in FIG. 1, and the plurality of data signal lines DL extend in a column direction orthogonal to the row direction.

Each of the plurality of gate signal lines GL is provided at a boundary between two pixels PIX adjacent to each other in the column direction. Each of the plurality of data signal lines DL is provided for a boundary between two pixels PIX adjacent to each other in the row direction. That is, the plurality of pixels PIX are partitioned by the plurality of gate signal lines GL and the plurality of data signal lines DL.

Each gate signal line GL is connected to transistors TR in pixels PIX arranged in the row direction. Specifically, each gate signal line GL is connected to gate electrode G of each transistor TR.

Each data signal line DL is connected to transistors TR in pixels PIX arranged in the column direction. Specifically, each data signal line DL is connected to source electrode S or drain electrode D of each transistor TR. In the exemplary embodiment, each data signal line DL is connected to source electrode S of each transistor TR.

In each pixel PIX, drain electrode D of transistor TR is connected to pixel electrode PIT. Common electrode MIT that is paired with each pixel electrode PIT is provided in each pixel PIX. In each pixel PIX, liquid crystal capacitance Cl is formed between pixel electrode PIT and common electrode MIT.

In the exemplary embodiment, the plurality of pixels PIX are divided into a plurality of segments, and a plurality of common electrodes MIT are provided corresponding to the plurality of segments. That is, common electrode MIT is divided into the plurality of segments, and separately formed corresponding to the plurality of segments.

In FIG. 1, a number of segments is identical to a total number of pixels in display region DSP, and the plurality of pixels PIX and the plurality of segments correspond to each other in a one-to-one manner. Thus, common electrode MIT is formed while being separated in each of the plurality of pixels PIX, and common electrodes MIT are provided as many as the total number of pixels in display region DSP.

Liquid crystal panel 10 includes a plurality of common lines CL connected to the plurality of common electrodes MIT. The plurality of common lines CL are connected to common driver 22 and detection circuit 40. In the exemplary embodiment, each of the plurality of common lines CL includes a portion extending in the column direction (second direction). Specifically, common line CL is formed in parallel to data signal line DL.

For example, common electrode MIT and common line CL are provided on the TFT substrate of liquid crystal panel 10. Alternatively, common electrode MIT and common line CL may be provided on the CF substrate of liquid crystal panel 10.

For example, column direction driver 20 (source driver 21, common driver 22) and row direction driver 30 are a driver IC (IC package), and mounted on a flexible wiring board as COF (Chip on Film). For example, the flexible wiring board is an FFC (Flexible Flat Cable) or an FPC (Flexible Printed Cable). The flexible wiring board on which column direction driver 20 (source driver 21, common driver 22) is mounted is connected to an electrode terminal formed in an outside region (frame region) of display region DSP of liquid crystal panel 10 by ACF (Anisotropic Conductive Film) compression bonding.

Source driver 21 of column direction driver 20 is connected to data signal line DL. According to selection of gate signal line GL using gate driver 31 of row direction driver 30, source driver 21 supplies a data voltage corresponding to a video signal input from an image processor (not illustrated) as the data signal to data signal line DL.

Common driver 22 of column direction driver 20 is connected to common line CL. In the case where an image is displayed on liquid crystal panel 10, common driver 22 supplies a common voltage to each common electrode MIT through common line CL.

Gate driver 31 of row direction driver 30 is connected to the gate signal line GL. Gate driver 31 supplies voltage (gate-on voltage) as the gate signal, which turns on transistor TR of pixel PIX in which the video signal is written according to a timing signal input from image processor, to gate signal line GL. Consequently, a data voltage is supplied from data signal line DL to pixel electrode PIT of selected pixel PIX through transistor TR.

In this way, when the gate-on voltage is supplied from gate driver 31 to gate signal line GL, transistor TR of selected pixel PIX is turned on, and the data voltage (data signal) is supplied from data signal line DL connected to transistor TR to pixel electrode PIT. An electric field is generated in a liquid crystal layer of liquid crystal panel 10 due to a difference between the data voltage supplied to pixel electrode PIT and the common voltage supplied to common electrode MIT. An alignment state of liquid crystal molecules of the liquid crystal layer in each pixel PIX is changed by the electric field, and transmittance of light of backlight passing through liquid crystal panel 10 is controlled in each pixel PIX. This allows a desired image to be displayed in display region DSP of liquid crystal panel 10.

For example, detection circuit 40 and determination circuit 50 are a driver IC (IC package) similarly to column direction driver 20 (source driver 21, common driver 22) and row direction driver 30. Detection circuit 40 and determination circuit 50 may be mounted on the flexible wiring board connected to liquid crystal panel 10, or mounted on a printed circuit board connected to liquid crystal panel 10 through the COF.

Detection circuit 40 detects a waveform of a common potential at common electrode MIT. In the exemplary embodiment, detection circuit 40 and the plurality of common electrodes MIT are connected to each other by the plurality of common lines CL. This allows detection circuit 40 to detect the waveform of the common potential at each of the plurality of common electrodes MIT through the plurality of common lines CL.

Specifically, when a predetermined gate signal is input to at least one gate signal line GL while a predetermined data signal is input to at least one data signal line DL, detection circuit 40 detects the waveform of the common potential at each of the plurality of common electrodes MIT.

Detection circuit 40 detects the waveform of the common potential at common electrode MIT in each of the plurality of segments (that is, in each of divided common electrode MIT). For example, when the number of divided segments is ten, detection circuit 40 detects ten kinds of waveforms of the common potentials corresponding to ten common electrodes MIT. In the exemplary embodiment, because the number of divided segments is the total number of pixels, the waveform of the common potential at common electrode MIT is detected in each of all the pixels PIX.

Determination circuit 50 determines presence or absence of abnormality of liquid crystal display device 1 based on the waveform of the common potential detected by detection circuit 40. Specifically, determination circuit 50 determines the abnormality of liquid crystal display device 1 by a distortion of the waveform of the common potential detected by detection circuit 40. In this case, determination circuit 50 can determine the abnormality of liquid crystal display device 1 based on rise or fall of the waveform of the common potential detected by detection circuit 40.

For example, the waveform of the common potential at a normal time is previously detected and stored in a memory, the waveform of the common potential detected by detection circuit 40 is compared to the waveform of the common potential at the normal time, and the determination is made that the abnormality occurs in pixel PIX of liquid crystal display device 1 when there is a portion in which the waveform of the common potential detected by detection circuit 40 is different from the waveform of the common potential at the normal time. At this point, the distortion of the waveform of the common potential can easily be detected by observing a rising portion or a falling portion of the waveform of the common potential detected by detection circuit 40.

Figure 2:
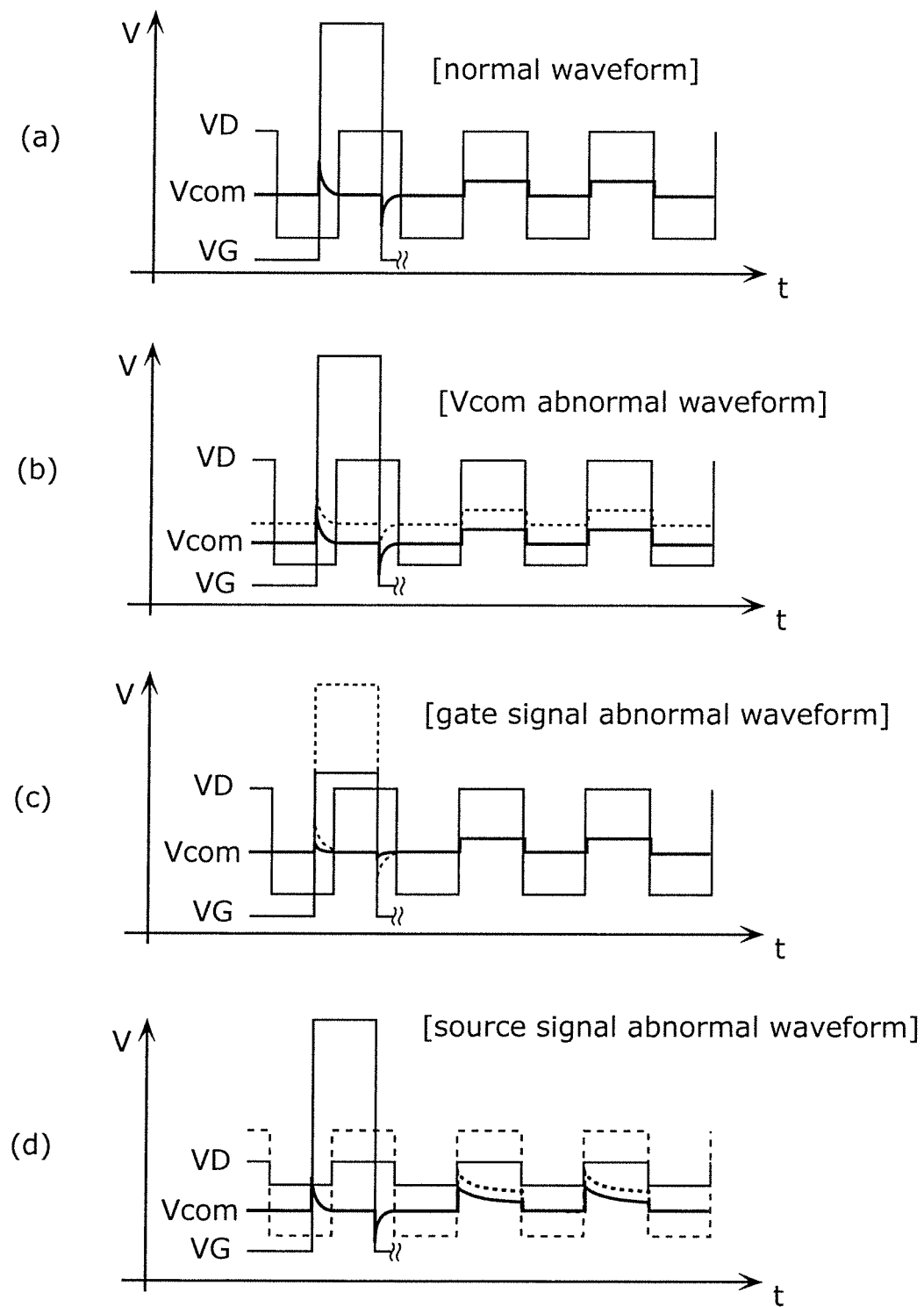
FIG. 2 is a view illustrating respective waveforms of gate voltage supplied to a gate signal line, data voltage supplied to a data signal line, and common potential at a common electrode detected by a detection circuit.

A specific example of the abnormality determination method of liquid crystal display device 1 will be described with reference to FIG. 2. FIG. 2 is a view illustrating three waveforms of gate voltage VG supplied to gate signal line GL, data voltage VD supplied to data signal line DL, and common potential Vcom at common electrode MIT detected by detection circuit 40. In FIG. 2, a part (a) illustrates the waveform when gate voltage VG, data voltage VD and common potential Vcom are normal, a part (b) illustrates the waveform when common potential Vcom is abnormal, a part (c) illustrates the waveform when gate voltage VG is abnormal, and a part (d) illustrates the waveform when data voltage VD is abnormal.

In FIG. 2, gate voltage VG and data voltage VD are a signal on an input side, and common potential Vcom detected by detection circuit 40 is a signal on an output side. Thus, when predetermined gate voltage VG (gate signal) is input to at least one gate signal line GL while predetermined data voltage VD (data signal) is input to at least one data signal line DL, common potential Vcom at common electrode MIT of pixel PIX corresponding to gate signal line GL and data signal line DL to which the signal is input is detected.

In liquid crystal display device 1 of the exemplary embodiment, the waveform of common potential Vcom at common electrode MIT is detected in each of the plurality of segments by detection circuit 40. That is, the waveform of common potential Vcom is detected as many as the number of segments.

At this point, as illustrated in the parts (b) to (d) of FIG. 2, in the case where the waveform of common potential Vcom at specific common electrode MIT detected by detection circuit 40 is different from the waveform of common potential Vcom at the normal time in the part (a) of FIG. 2 (that is, in the case where the distortion occurs in the waveform of common potential Vcom), determination circuit 50 determines that the abnormality has occurred in liquid crystal display device 1 based on the abnormality of common potential Vcom. Determination circuit 50 can specify an abnormal portion where the abnormality of liquid crystal display device 1 has occurred and a type of the abnormality.

For example, as can be seen from the part (b) of FIG. 2, because an absolute value of entire common potential Vcom detected by detection circuit 40 is lower than an absolute value of entire common potential Vcom at the normal time, some defect such as a short circuit of common electrode MIT or superimposition of noise has occurred in the segment corresponding to common electrode MIT where common potential Vcom is detected.

As can be seen from the part (c) of FIG. 2, because the waveforms at the rise and fall of gate voltage VG are different from those at the normal time with respect to common potential Vcom detected by detection circuit 40, some defect has occurred with respect to gate signal line GL in the segment corresponding to common electrode MIT where common potential Vcom is detected. For example, it is considered that the defect such as a short circuit between gate signal line GL and common electrode MIT or common line CL has occurred.

Figure 3:
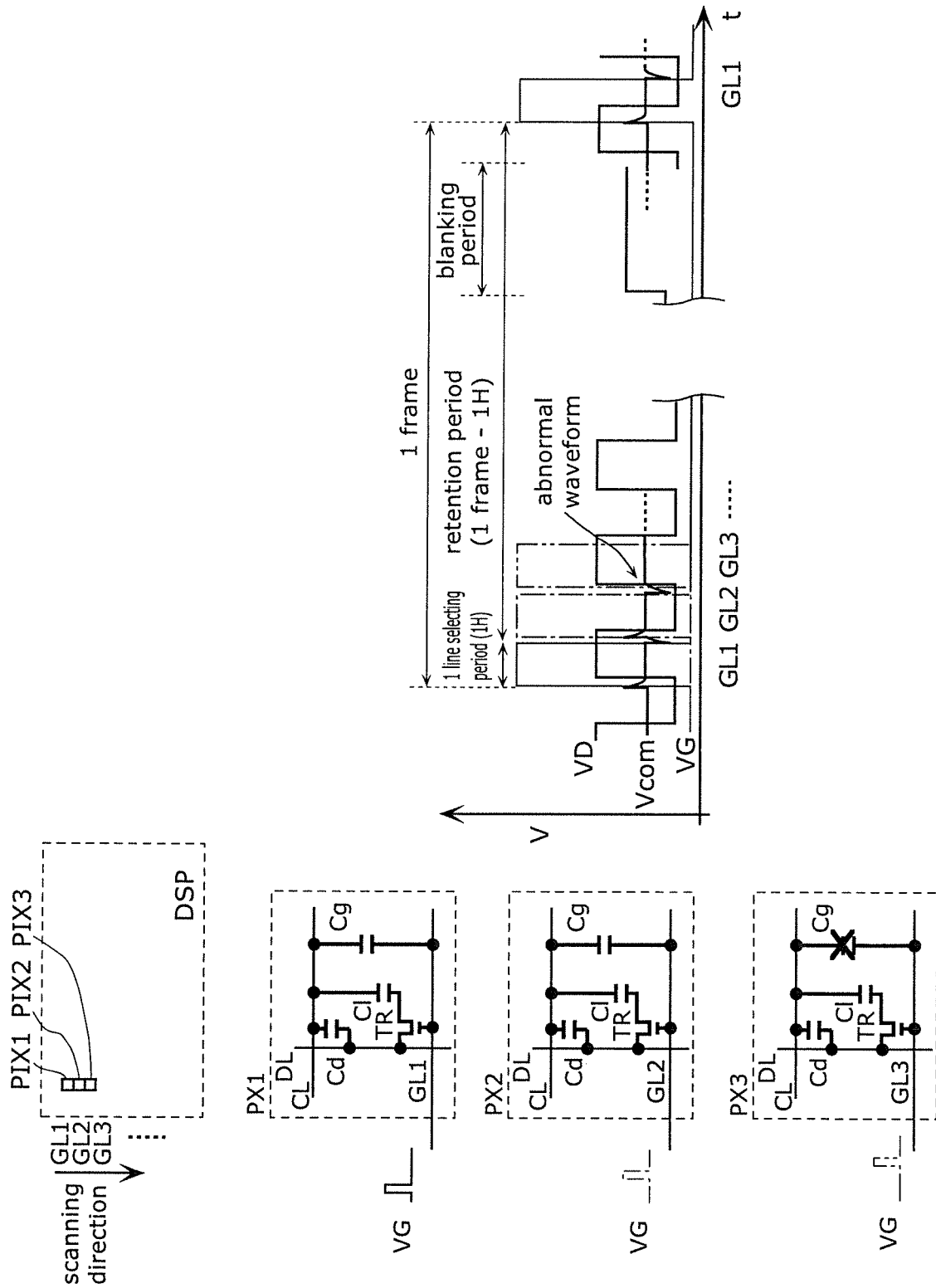
FIG. 3 is a view illustrating a method for detecting abnormality of the gate line in the liquid crystal display device according to the exemplary embodiment.

In this case, gate signal line GL in which the trouble has occurred can be detected as illustrated in FIG. 3. For example, the plurality of gate signal lines GL are sequentially scanned in the order of gate signal lines GL1, GL2, GL3, . . . , and the plurality of gate signal lines GL are sequentially checked one by one, which allows recognition of which gate signal lines GL the defect has occurred. For example, in FIG. 3, because the distortion occurs in the waveform of common potential Vcom at the rise and the fall of gate voltage VG at gate signal line GL3, the occurrence of the abnormality due to gate capacitance Cg of transistor TR in pixel PIX3 can be specified. In this case, as the abnormality of pixel PIX3, as illustrated in FIG. 3 for example, it is considered that gate signal line GL3 and common electrode MIT or common line CL are short-circuited.

As can be seen from the part (d) of FIG. 2, because the waveforms at the rise and fall of data voltage VD are different from those at the normal time with respect to common potential Vcom detected by detection circuit 40, some defect has occurred with respect to data signal line DL in the segment corresponding to common electrode MIT where common potential Vcom is detected.

For example, as can be seen from the part (d) of FIG. 2, because a rise amount of common potential Vcom at the rise of data voltage VD is smaller than that at the normal time, the abnormality has occurred due to drain capacitance Cg of transistor TR. Specifically, it is considered that the defect such as the short circuit between data signal line DL and common electrode MIT or common line CL has occurred.

Figure 4:
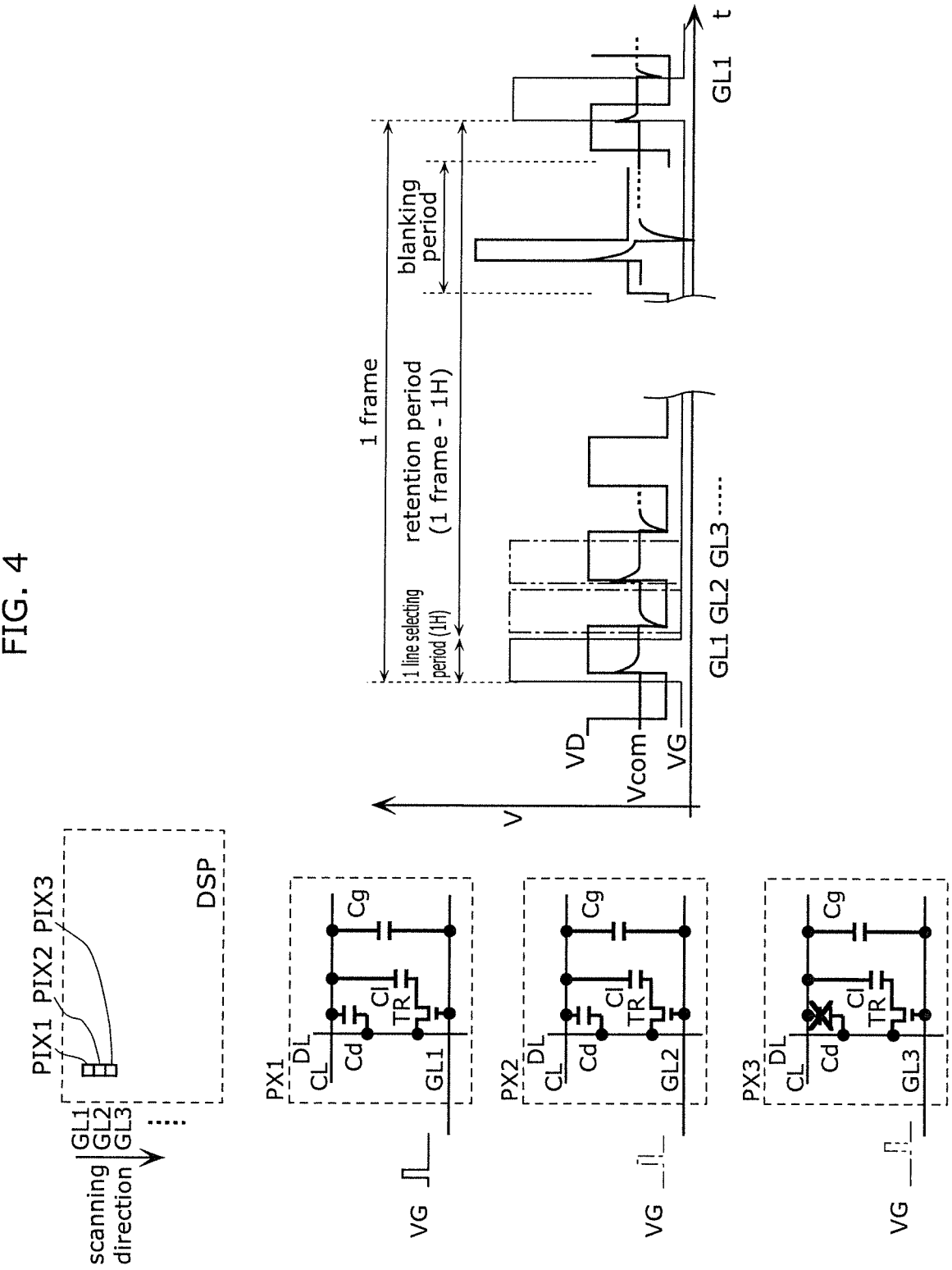
FIG. 4 is a view illustrating a method for detecting abnormality of the data line in the liquid crystal display device according to the exemplary embodiment.

In this case, data signal line DL in which the defect has occurred can be detected as illustrated in FIG. 4. For example, although it is necessary to change a threshold of data voltage VD according to the display image, data signal line DL and the pixel (in FIG. 4, pixels PIX3) in which the abnormality occurred can be specified by directly detecting common potential Vcom of the drive waveform. Alternatively, presence or absence of the distortion of the waveform of common potential Vcom in a flyback period (blanking period) is determined by determination circuit 50 by inserting a pulse signal as predetermined detection data voltage VD (data signal) in the flyback period, which allows data signal line DL and the pixel (in FIG. 4, pixel PIX3) in which the abnormality occurred to be specified without affecting the display image. As the abnormality of pixel PIX3, as illustrated in FIG. 4 for example, it is considered that data signal line DL3 and common electrode MIT or common line CL of pixel PIX3 are short-circuited.

However, when data voltage VD is applied to data signal line DL while gate-on voltage VG is applied to gate signal line GL, an electric field is generated between pixel electrode PIX and common electrode CIT to rotate a liquid crystal molecule. For this reason, a low voltage (gate-off voltage) VG is preferably applied (input) to gate signal line GL in the flyback period such that the transistor is not turned on. Consequently, because necessity to generate the electric field between pixel electrode PIX and common electrode CIT is eliminated, even if the backlight is lit, the abnormality of liquid crystal display device 1 can be determined without affecting the display image.

In the case where predetermined detection data voltage VD is inserted in the flyback period, an amplitude of predetermined detection data voltage VD input to data signal line DL in the flyback period is larger than an amplitude of data voltage VD in displaying the normal display image. Consequently, the distortion of common potential Vcom appears greatly, so that the abnormality can easily be determined.

As described above, in liquid crystal display device 1 of the exemplary embodiment, detection circuit 40 detects the waveform of common potential Vcom at common electrode MIT corresponding to each of the plurality of segments, and determination circuit 50 make the determination based on the detected waveform, which allows the determination of the abnormality in liquid crystal display device 1. That is, liquid crystal display device 1 can self-determine the abnormality.

In liquid crystal display device 1 of the exemplary embodiment, not only the abnormality can be determined, but also the abnormal portion where the abnormality has occurred and the type of the abnormality can be specified in liquid crystal display device 1.

Timing of determining the abnormality of liquid crystal display device 1 will be described below.

Figure 5:
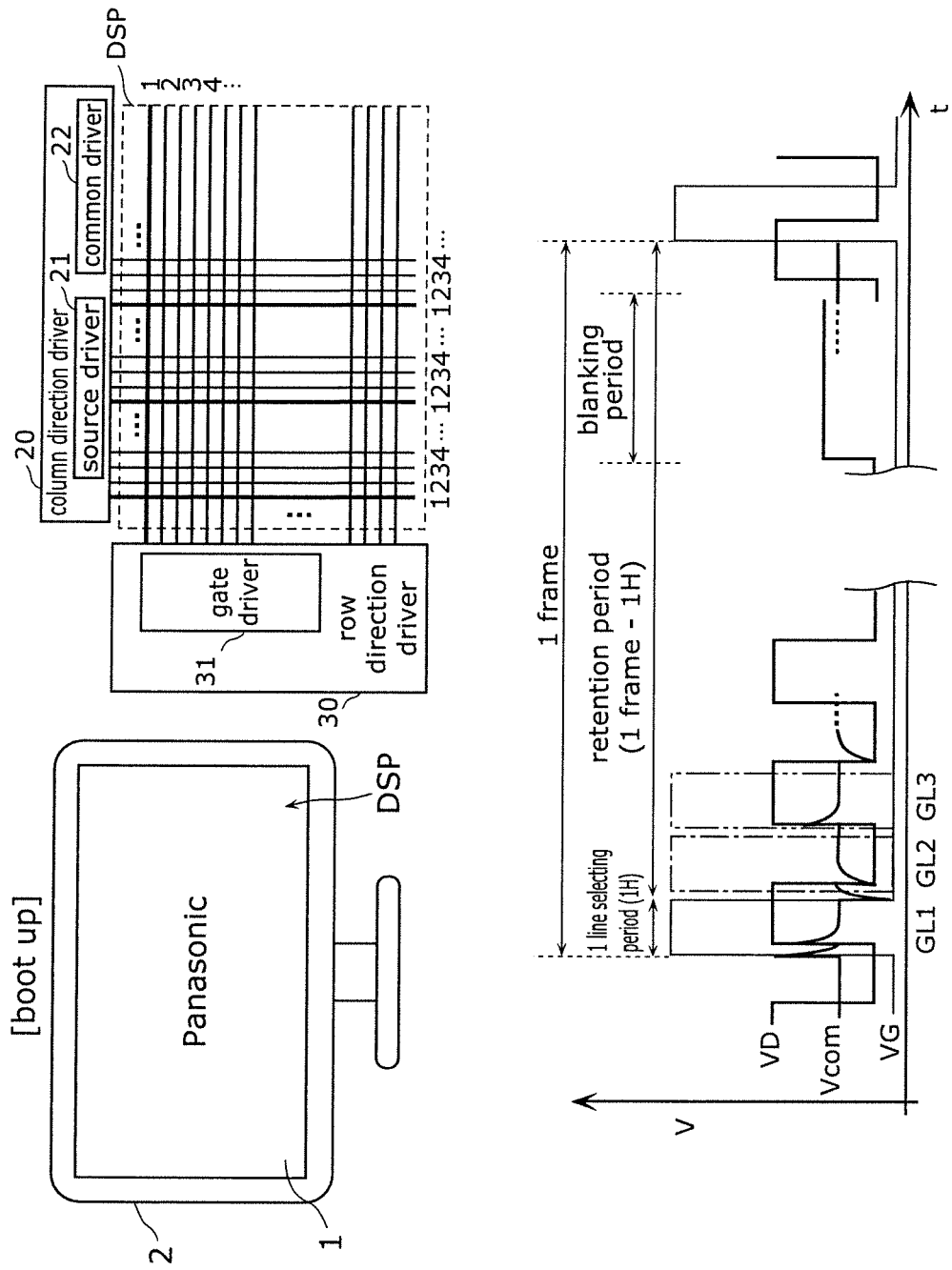
FIG. 5 is a view illustrating a method for detecting abnormality of the liquid crystal display device according to the exemplary embodiment when the liquid crystal display device is activated.

First, the case will be described where the abnormality is determined when monitor 2 in which liquid crystal display device 1 is incorporated is activated by an information processing device such as a personal computer. That is, an abnormality determination method during initial check will be described. FIG. 5 is a view illustrating the abnormality determination method when monitor 2 in which liquid crystal display device 1 is incorporated is activated by the information processing device.

In this case, as illustrated in FIG. 5, the abnormality can be determined using a logo displayed on monitor 2 when monitor 2 is activated (that is, when liquid crystal display device 1 is activated). A logo of "Panasonic" is displayed in FIG. 5.

The logo displayed during the activation of monitor 2 is a fixed display pattern, and the identical image is continuously displayed without change for a fixed time like a still image. That is, the waveforms of gate voltage VG and data voltage VD on the input side are uniform over the whole screen of display region DSP for a fixed time (every fixed frame). For example, in a portion in which the display image is white, the amplitude of data voltage VD is uniform as illustrated in FIG. 5.

At this point, the abnormality of liquid crystal display device 1 can be determined in the similar manner. Specifically, by sequentially scanning the plurality of gate signal lines GL to detect common potential Vcom in each gate signal line GL, the occurrence of the defect of gate signal line GL and/or data signal line can be checked, and gate signal line GL and/or the data signal line in which the abnormality occurred can be specified.

The abnormalities of gate signal line GL and the plurality of data signal lines can simultaneously be checked according to the number of segments (the number of common electrodes MIT) as indicated by the thick line shown in display region DSP of FIG. 5. A thick line shown in display region DSP of FIG. 5 indicates gate signal line GL and data signal line DL to be inspected.

In this way, in FIG. 5, the abnormality of liquid crystal display device 1 is determined based on the waveform of common potential Vcom during the activation of monitor 2 (liquid crystal display device 1). In other words, when the waveforms of gate voltage VG and data voltage VD are uniform over a whole screen of display region DSP for a fixed time, the abnormality is determined by the distortion of common potential Vcom. Thus, the abnormality in liquid crystal display device 1 can easily be determined. The abnormal portion and the type of the abnormality in liquid crystal display device 1 can also be specified.

In FIG. 5, the logo is used to determine the abnormality during the activation of monitor 2 (liquid crystal display device 1), but the present disclosure is not limited to this configuration. Alternatively, another display image other than the logo may be used as long as the waveforms of gate voltage VG and data voltage VD are an image uniformly displayed in the whole screen of display region DSP for a fixed time.

Figure 6:
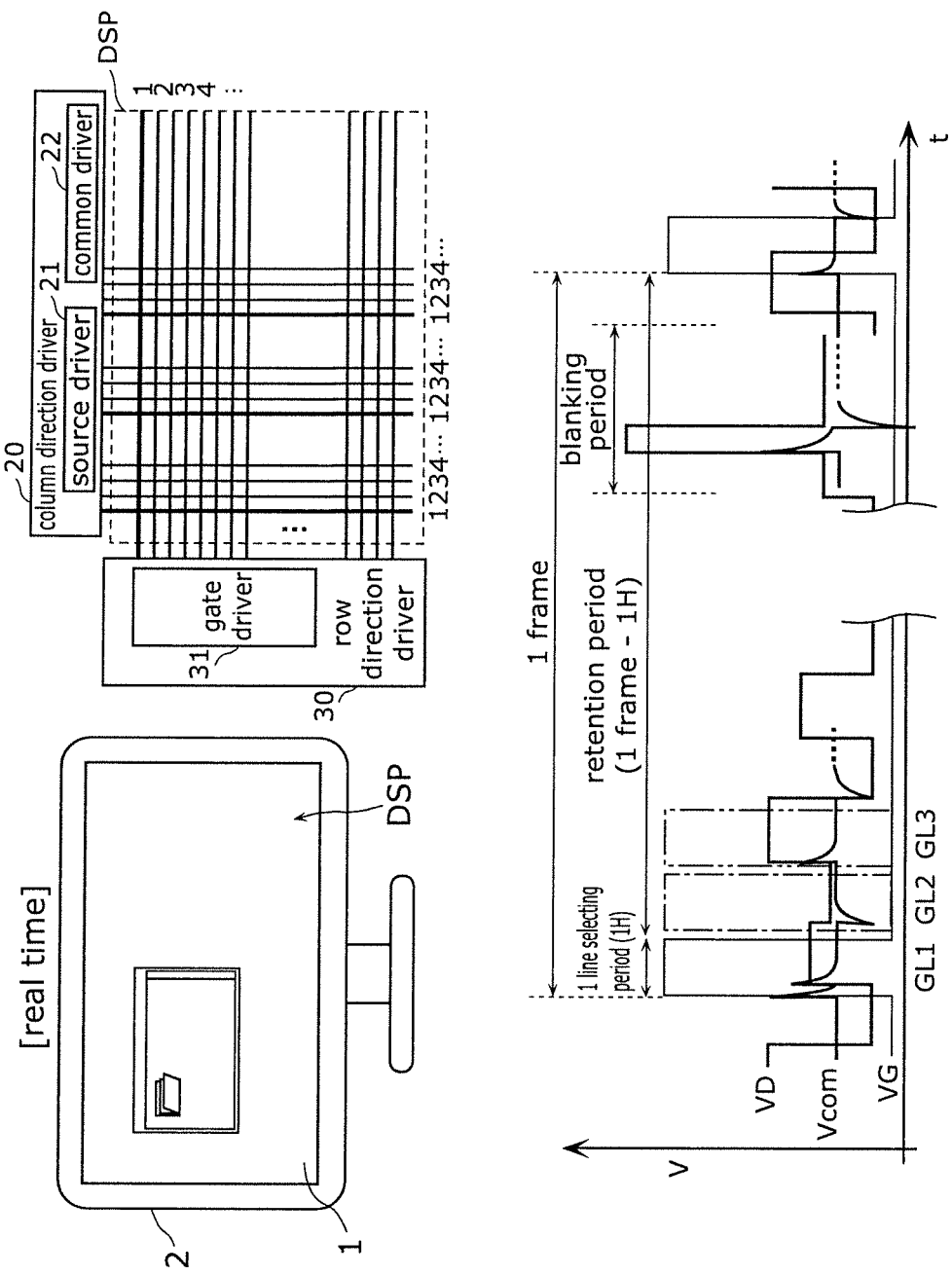
FIG. 6 is a view illustrating a method for detecting abnormality of the liquid crystal display device according to the exemplary embodiment in real time.

The case will be described below where the abnormality is determined when a user uses monitor 2 in which liquid crystal display device 1 is incorporated. That is, an abnormality determination method in real time will be described. FIG. 6 is a view illustrating the abnormality determination method when the user uses monitor 2 in which liquid crystal display device 1 is incorporated.

In this case, because the image displayed on monitor 2 is not the fixed display image such as the logo, as illustrated in FIG. 6, the waveform of data voltage VD fluctuates even in one frame period, and the uniform amplitude is not obtained. For this reason, the number of waveforms of data voltage VD becomes as many as several tens of thousands, and therefore the number of common potentials Vcom detected by detection circuit 40 also becomes several tens of thousands.

In the case where the abnormality of liquid crystal display device 1 is determined in real time, determination circuit 50 determines the abnormality of liquid crystal display device 1 based on the waveform of common potential Vcom in the flyback period. Specifically, gate-off voltage VG and data signal VD are collectively input to the plurality of gate signal lines GL and the plurality of data signal lines DL, and the pulse signal is inserted as predetermined detection data voltage VD (data signal) in the flyback period as described above, whereby determination circuit 50 determines the presence or absence of the distortion of the waveform of common potential Vcom in the flyback period. This allows the abnormality of liquid crystal display device 1 to be determined without affecting the display image. For example, data signal line DL and the pixel in which the abnormality occurred can be specified.

In the case where predetermined detection data voltage VD is inserted in the flyback period, as described above, the amplitude of predetermined detection data voltage VD input to data signal line DL in the flyback period is larger than the amplitude of data voltage VD in displaying the normal display image. Consequently, the distortion of common potential Vcom appears greatly, so that the abnormality can easily be determined.

The abnormalities of the plurality of gate signal lines GL and the plurality of data signal lines can simultaneously be checked according to the number of segments (the number of common electrodes MIT) as indicated by the thick line shown in display region DSP of FIG. 6. In FIG. 6, the thick line shown in display region DSP indicates gate signal line GL and data signal line DL to be inspected.

Figure 7:
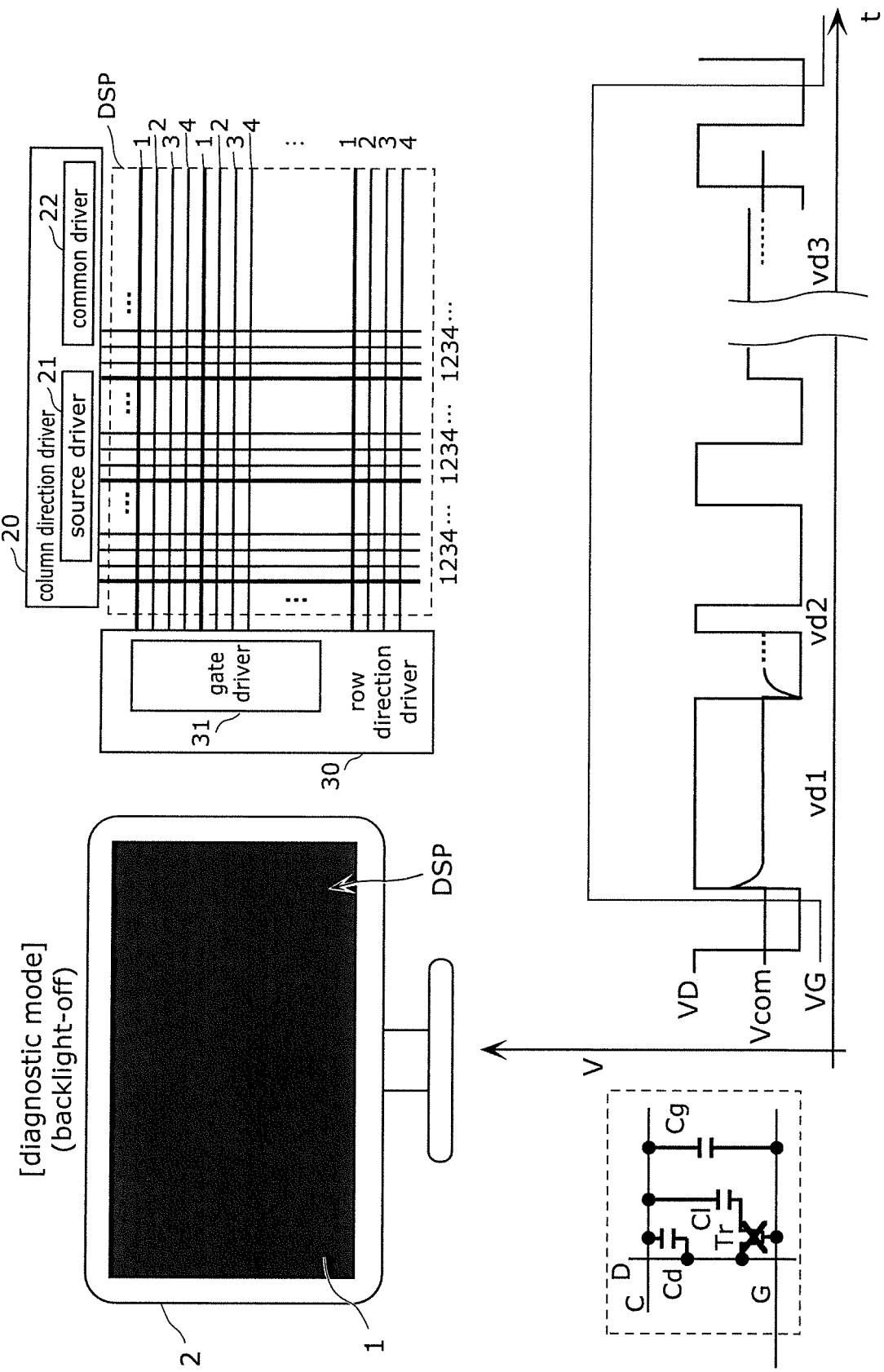
FIG. 7 is a view illustrating a method for detecting abnormality of the liquid crystal display device according to the exemplary embodiment by a diagnosis mode.

The case will be described below where the abnormality is determined by setting monitor 2, in which liquid crystal display device 1 is incorporated, to a diagnosis mode. FIG. 7 is a view illustrating the abnormality determination method by setting monitor 2, in which liquid crystal display device 1 is incorporated, to the diagnosis mode.

In this case, the abnormality in liquid crystal display device 1 is determined while the backlight is turned off to set the whole screen of display region DSP to black display. For this reason, as gate voltage VG and data voltage VD on the input side, the abnormality can be determined by supplying the voltage (signal) having an inspection waveform to gate signal line GL and data signal line DL.

In the exemplary embodiment, in the state in which the backlight of liquid crystal display device 1 is turned off, as illustrated in FIG. 7, an inspection gate signal (gate voltage) turning on transistor TR of the plurality of pixels PIX is input as the predetermined gate signal to the plurality of gate signal lines GL, and an inspection data signal (data voltage) is input as the predetermined data signal to the plurality of data signal lines DL in the period in which transistor TR is turned on.

That is, a period of the state in which the gate of transistor TR of pixel PIX to be inspected is open is kept for a fixed time, and inspection data voltage VD having the inspection waveform is supplied to data signal line DL in the period. At this point, the backlight is turned off, the image is not displayed in display region DSP no matter what kind of data voltage VD is supplied, so that the amplitude and pulse width of the pulse waveform of data voltage VD can freely be changed. For example, as illustrated in FIG. 7, the period of the state in which the gate of transistor TR of pixel PIX to be inspected is open is kept for a fixed time, and the plurality of data voltages VD (vd1, vd2, vd3, . . . ) in which the amplitude and pulse width of the pulse waveform vary may be supplied to data signal line DL in the period.

At this point, detection circuit 40 detects a convergence time (unsharped state) of common potential Vcom at the rise and fall of data voltage VD corresponding to input data voltage VD and gate voltage VG, which allows the abnormality of transistor TR to be determined in units of pixels PIX. That is, performance of transistor TR can be evaluated in units of pixels PIX. For example, when the transistor TR deteriorates, the convergence time of common potential Vcom is lengthened.

At this point, transistor TR is turned on while the amplitude of inspection gate voltage VG is lower than the amplitude of gate voltage VG during normal operation, and an on-resistance is intentionally given to transistor TR, which allows the convergence time of common potential Vcom to be lengthened at the rise and the fall of data voltage VD. Consequently, a peak hold period of common potential Vcom is easily detected, so that the abnormality of transistor TR can easily be determined.

In this way, in FIG. 7, since the abnormality of liquid crystal display device 1 is determined in the diagnosis mode in which the backlight is turned off, the inspection gate signal and the inspection data signal can freely be input as the input-side signal. Thus, the abnormality can easily be determined in units of pixels PIX.

In the case where the abnormality of liquid crystal display device 1 is determined in the diagnosis mode, the plurality of pixels PIX need not be divided into the plurality of segments unlike the abnormality determination method in FIGS. 5 and 6. That is, the plurality of common electrodes MIT may not be provided corresponding to the plurality of segments, but the common electrode MIT may be one electrode common to all pixels PIX.

However, the abnormalities of the plurality of pixels PIX can simultaneously be checked according to the number of segments (the number of common electrodes MIT) as indicated by the thick line shown in display region DSP of FIG. 7. Consequently, an abnormality determination time can be shortened. In FIG. 7, the thick line shown in display region DSP indicates gate signal line GL and data signal line DL to be inspected.

As described above, liquid crystal display device 1 of the exemplary embodiment includes detection circuit 40 that detects the waveform of common potential Vcom at common electrode MIT and determination circuit 50 that determines the abnormality of liquid crystal display device 1 based on common potential Vcom detected by detection circuit 40. This allows liquid crystal display device 1 to self-determine the abnormality of the portion associated with common electrode MIT in liquid crystal display device 1. In liquid crystal display device 1 of the exemplary embodiment, the abnormal portion and the type of the abnormality can be specified in addition to the abnormality.

In the case where determination circuit 50 determines the abnormality of liquid crystal display device 1, the process of suppressing or eliminating the abnormality may be performed depending on the abnormal portion and the type of the abnormality.

For example, in the case where determination circuit 50 determines the abnormality of gate signal line GL and/or data signal line DL, the abnormal state of liquid crystal display device 1 can be suppressed or eliminated by supplying the input signal that is corrected with respect to gate signal line GL and/or data signal line DL determined to be abnormal. Depending on the type of the abnormality of gate signal line GL and/or data signal line DL, sometimes the correction cannot be performed. In this case, feedback is preferably performed to the system on the assumption that the display abnormality is present. In the case where the abnormality of liquid crystal display device 1 is determined at the time of manufacturing liquid crystal display device 1, normal liquid crystal display device 1 can be made by repairing the abnormal portion. That is, the technique of the present disclosure can be applied to the processes of the method for manufacturing liquid crystal display device 1.

Alternatively, in the case where determination circuit 50 determines that performance of transistor TR in specific pixel PIX deteriorates, the amplitude of gate voltage VG and/or data voltage VD supplied to transistor TR of specific pixel PIX is increased larger than an initial value to increase the input value, thereby compensating for the deteriorated performance of transistor TR. The allows the suppression or elimination of the abnormal state of liquid crystal display device 1 due to the performance deterioration of transistor TR.

In the layout of the exemplary embodiment, the number of divided segments is the total number of pixels, and individual common electrode MIT is provided in each of all pixels PIX. However, the division layouts of the segment and the common electrode MIT are not limited to this configuration.

Figure 8A:
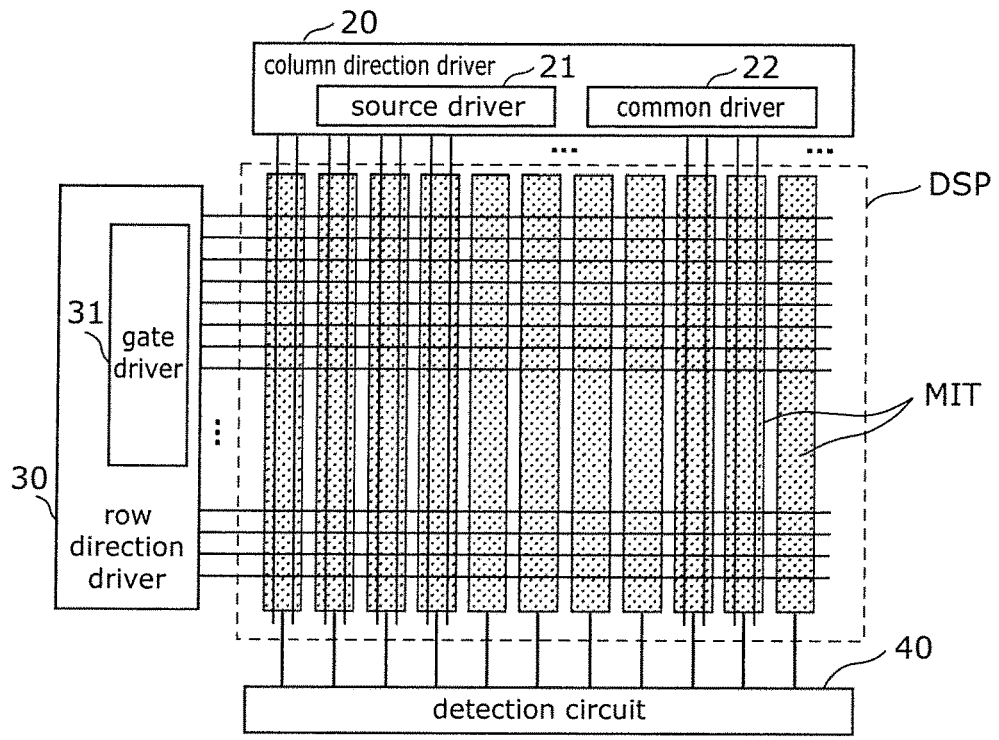
FIG. 8A is a view illustrating a first layout of a common electrode in the liquid crystal display device according to the exemplary embodiment.

Specifically, as illustrated in FIG. 8A, the plurality of pixels PIX are divided into ten segments arrayed in the row direction, and ten common electrodes MIT each of which extends in the column direction may be arranged in the row direction. In this case, the numbers of segments and common electrodes MIT are not limited to ten. In FIG. 8A, common electrode MIT (segment) is indicated by dotted hatching.

In the case of the layout in FIG. 8A, in any one of the activation check (FIG. 5), real time check (FIG. 6), and diagnostic mode check (FIG. 7), the abnormality of gate signal line GL can be determined by sequentially scanning gate signal line GL one by one, and the abnormality of data signal line DL can simultaneously be determined according to the number of divided segments. That is, data voltage VD is simultaneously supplied to data signal line DL so as to become one in each segment, and the plurality of pixels PIX are divided into ten segments in the example of FIG. 8A, so that the abnormalities of ten data signal lines DL can simultaneously be determined by simultaneously supplying data voltage VD to ten data signal lines DL. On the other hand, the abnormality is hardly determined in units of pixels PIX during the activation time check and the real time check, but the abnormality can be determined during the diagnosis mode check.

Figure 8B:
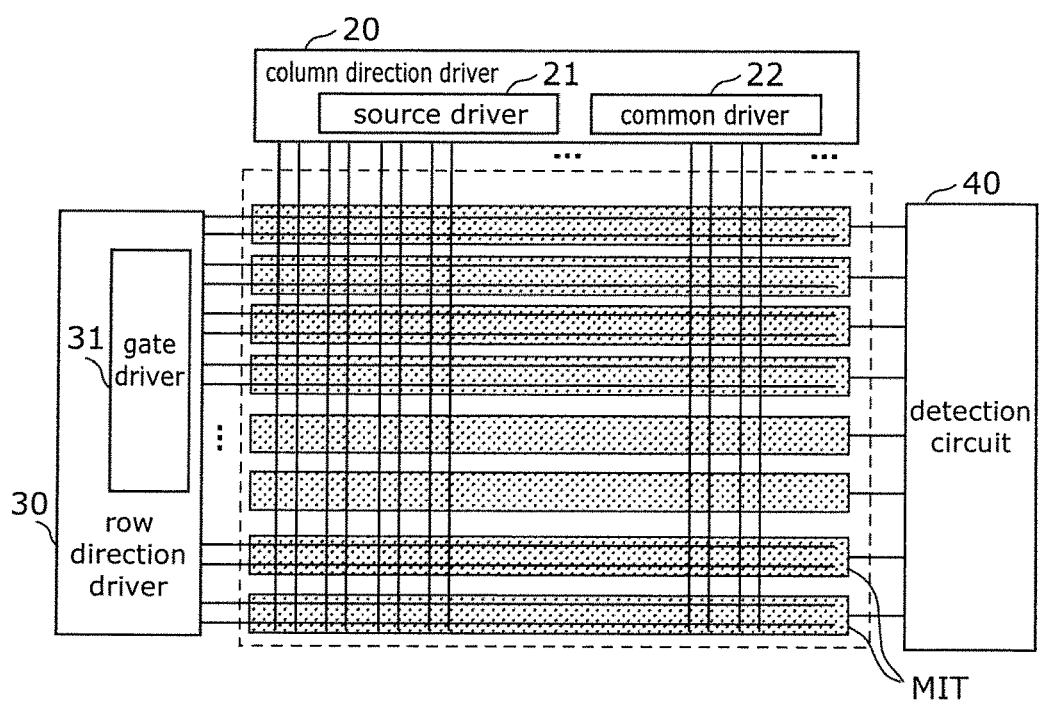
FIG. 8B is a view illustrating a second layout of a common electrode in the liquid crystal display device according to the exemplary embodiment.

As illustrated in FIG. 8B, as the divided layouts of the segment and common electrode MIT, the plurality of pixels PIX are divided into ten segments arrayed in the column direction, ten common electrodes MIT each of which extends in the row direction may be arranged in the column direction. In this case, detection circuit 40 is disposed at a position opposed to row direction driver 30 in consideration of the wiring layout of common line CL. However, but the present disclosure is not limited to this configuration. The numbers of segments and common electrodes MIT are not limited to ten. In FIG. 8B, common electrode MIT (segment) is indicated by dotted hatching.

In the case of the layout in FIG. 8B, the abnormality of gate signal line GL can be determined one by one by sequentially scanning gate signal line GL in the activation time check (FIG. 5) and the real time check (FIG. 6), and the abnormality of gate signal line GL can simultaneously be determined according to the number of segment divisions in the diagnostic mode check (FIG. 7). The abnormality of data signal line DL is determined one by one in any one of the activation time check, the real time check, and the diagnosis mode check. Similarly to the case in FIG. 8A, the abnormality is hardly determined in units of pixels PIX in the activation time check and the real time check, but the abnormality can be determined in units of pixels PIX in the diagnosis mode check.

Figure 8C:
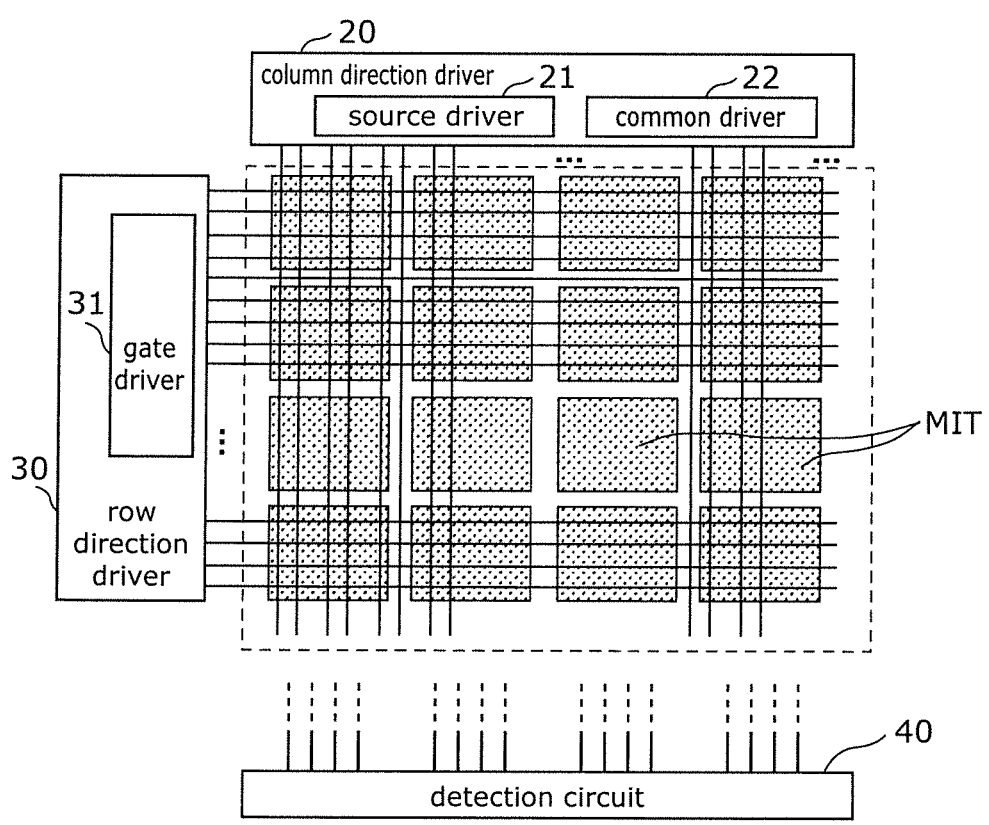
FIG. 8C is a view illustrating a third layout of a common electrode in the liquid crystal display device according to the exemplary embodiment.

As illustrated in FIG. 8C, as the divided layouts of the segment and common electrode MIT, the plurality of pixels PIX are divided into 16 (4 in the vertical direction×4 in the horizontal direction) segments arranged in a matrix form, and common electrode MIT may be provided so as to correspond to 16 segments. In this case, the numbers of segments and common electrodes MIT are not limited to ten. In FIG. 8C, common electrode MIT (segment) is indicated by dotted hatching.

In the case of the layout in FIG. 8C, similarly to the case in FIG. 8B, the abnormality of gate signal line GL can be determined one by one by sequentially scanning gate signal line GL in the activation time check (FIG. 5) and the real time check (FIG. 6), and the abnormality of gate signal line GL can simultaneously be determined according to the number of segment divisions in the diagnostic mode check (FIG. 7). Similarly to the case in FIG. 8B, the abnormality of data signal line DL can simultaneously be determined according to the number of segment divisions in any one of the activation time check, the real time check, and the diagnosis mode check. Similarly to the case in FIG. 8B, the abnormality is hardly determined in units of pixels PIX in the activation time check and the real time check, but the abnormality can be determined in units of pixels PIX in the diagnosis mode check.

As described above, there are a wide range of division layouts of the segment and common electrode MIT, but the plurality of common electrodes MIT provided corresponding to the plurality of segments may be formed in an elongated shape in which a longitudinal direction is set to the direction parallel to the signal line having the larger number in the plurality of gate signal lines GL and the plurality of data signal lines LC. For example, in FIGS. 8A to 8C, the layout in FIG. 8A is preferable. Consequently, the determination time (inspection period) can be shortened in the flyback period. Determination circuit 50 is omitted in FIGS. 8A to 8C.

(Modifications)

The liquid crystal display device and the like of the present disclosure are described above based on the exemplary embodiment, but the present disclosure is not limited to the exemplary embodiment.

For example, in the exemplary embodiment, the plurality of common lines CL extend in the column direction. However, the present disclosure is not limited to this configuration. The plurality of common lines CL can be formed in any pattern as long as detection circuit 40 can detect the waveform of the common potential at common electrode MIT through each common line CL.

In the exemplary embodiment, data signal line DL is connected to source electrode S of transistor TR, and pixel electrode PIT is connected to drain electrode D of transistor TR. However, the present disclosure is not limited to this configuration. For example, data signal line DL may be connected to drain electrode D of transistor TR, and pixel electrode PIT may be connected to source electrode S of transistor TR.

In the exemplary embodiment, column direction driver 20 (source driver 21, common driver 22) and row direction driver 30 are connected to liquid crystal panel 10 by the flexible wiring board. However, the present disclosure is not limited to this configuration. For example, column direction driver 20 (source driver 21, common driver 22) and row direction driver 30 may directly be mounted on liquid crystal panel 10. In this case, as an example, column direction driver 20 (source driver 21, common driver 22) and row direction driver 30 can be mounted on the TFT substrate of liquid crystal panel 10 by a COG (Chip On Glass) technique. Detection circuit 40 and determination circuit 50 may also directly be mounted on liquid crystal panel 10.

In the exemplary embodiment, common line CL is separately formed in order to detect common potentials Vcom at the plurality of divided common electrodes MIT. However, the sensor electrode provided in the touch panel can be used as common line CL using the touch panel as liquid crystal display device 1. In this case, the sensor driver provided in the touch panel can be used as detection circuit 40 and determination circuit 50. That is, the liquid crystal display device of the present disclosure can be implemented by mounting the circuit having the circuit function of the present disclosure on the touch panel using the touch panel including the data signal line, the gate signal line, the pixel electrode, the plurality of common electrodes corresponding to the plurality of segments, the sensor electrode line, the gate driver, the common driver, and the sensor driver.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device including a plurality of pixels arranged in a matrix form, the liquid crystal display device comprising:
   a plurality of transistors and a plurality of pixel electrodes, which are provided in each of the plurality of pixels, respectively;
   a plurality of gate signal lines that extend in a first direction and are connected to gate electrodes of the plurality of transistors, respectively;
   a plurality of data signal lines that extend in a second direction different from the first direction and are connected to source electrodes or drain electrodes of the plurality of transistors, respectively;
   a plurality of common electrodes that are opposed to the plurality of pixel electrodes, respectively;
   a detection circuit that detects a waveform of a common potential at the common electrode; and
   a determination circuit that determines abnormality of the liquid crystal display device based on the waveform of the common potential detected by the detection circuit,
   wherein the plurality of pixels are divided into a plurality of segments,
   the plurality of the common electrodes are provided corresponding to the plurality of segments,
   the detection circuit detects the waveform of the common potential at each of the plurality of common electrodes when a predetermined data signal is input to at least one of the plurality of data signal lines while a predetermined gate signal is input to at least one of the plurality of gate signal lines, and
   wherein the determination circuit determines the abnormality of the liquid crystal display device based on the waveform of the common potential in a flyback period.

2. The liquid crystal display device according to claim 1, wherein the determination circuit determines the abnormality of the liquid crystal display device based on rise or fall of the waveform of the common potential.

3. The liquid crystal display device according to claim 1, further comprising a plurality of common lines connected to the plurality of common electrodes, respectively,
   wherein the detection circuit detects the waveform of the common potential at each of the plurality of common electrodes through the plurality of common lines.

4. The liquid crystal display device according to claim 3, wherein the plurality of common lines extend in the second direction.

5. The liquid crystal display device according to claim 1, wherein an amplitude of the predetermined data signal input to the data signal line in the flyback period is larger than an amplitude of the data signal in displaying a normal display image.

6. The liquid crystal display device according to claim 1, wherein
   while a backlight of the liquid crystal display device is turned off, an inspection gate signal that turns on the transistors of the plurality of pixels is input as the predetermined gate signal to at least one of the plurality of gate signal lines, and an inspection data signal is input as the predetermined data signal to at least one of the plurality of data signal lines in a period in which the transistor is turned on, and the determination circuit determines the abnormality of the liquid crystal display device based on the waveform of the common potential in a state in which the backlight is turned off.

7. The liquid crystal display device according to claim 1, wherein the determination circuit determines the abnormality of the liquid crystal display device based on the waveform of the common potential during activation of the liquid crystal display device.

8. The liquid crystal display device according to claim 1, wherein the plurality of common electrodes are formed in an elongated shape in which a longitudinal direction is set to a direction parallel to a signal line having a larger number among the plurality of gate signal lines and the plurality of data signal lines.

9. A liquid crystal display device including a plurality of pixels arranged in a matrix form, the liquid crystal display device comprising:
   a plurality of transistors and a plurality of pixel electrodes, which are provided in each of the plurality of pixels;
   a plurality of gate signal lines that extend in a first direction and are connected to gate electrodes of the plurality of transistors, respectively;
   a plurality of data signal lines that extend in a second direction different from the first direction and are connected to source electrodes or drain electrodes of the plurality of transistors, respectively;
   a common electrode that is opposed to the plurality of pixel electrodes;
   a detection circuit that detects a waveform of a common potential at the common electrode; and
   a determination circuit that determines abnormality of the liquid crystal display device based on the waveform of the common potential detected by the detection circuit,
   wherein while a backlight of the liquid crystal display device is turned off, an inspection gate signal that turns on the transistors of the plurality of pixels is input to at least one of the plurality of gate signal lines, and an inspection data signal is input to at least one of the plurality of data signal lines in a period in which the transistors are turned on, and
   the determination circuit determines the abnormality of the liquid crystal display device based on the waveform of the common potential in a state in which the backlight is turned off,
   wherein the determination circuit determines the abnormality of the liquid crystal display device based on the waveform of the common potential in a flyback period.

10. The liquid crystal display device according to claim 9, wherein a plurality of the inspection data signals are input to at least one of the plurality of data signal lines in a period in which the inspection gate signal is input to at least one of the plurality of gate signal lines to turn on the transistors.

11. The liquid crystal display device according to claim 9, wherein a plurality of the inspection data signals in which amplitudes of pulse waveforms are different from each other are input to at least one of the plurality of data signal lines in a period in which the inspection gate signal is input to at least one of the plurality of gate signal lines to turn on the transistors.

12. The liquid crystal display device according to claim 9, wherein a plurality of the inspection data signals in which pulse widths are different from each other are input to at least one of the plurality of data signal lines in a period in which the inspection gate signal is input to at least one of the plurality of gate signal lines to turn on the transistors.

* * * * *